Nov. 5, 1974     R. R. DESAI     3,846,175
STORAGE BATTERY
Filed Jan. 18, 1968     2 Sheets-Sheet 1
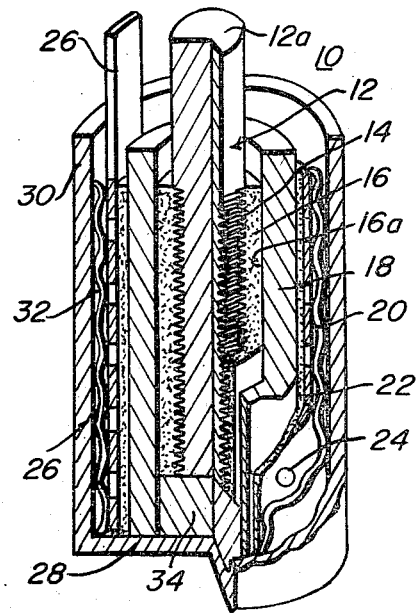
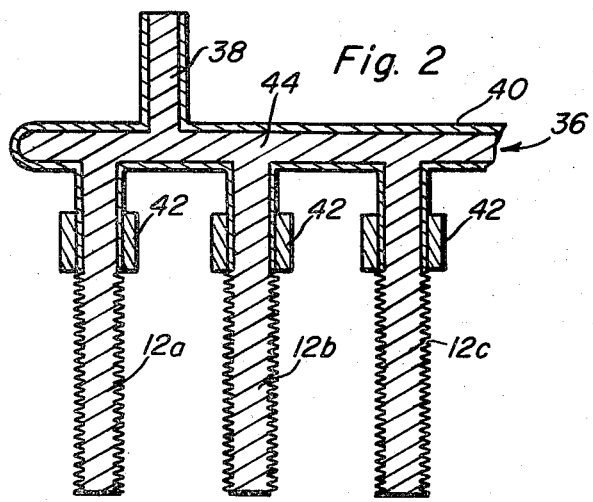
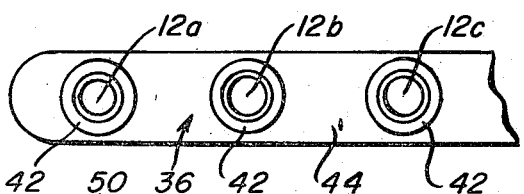
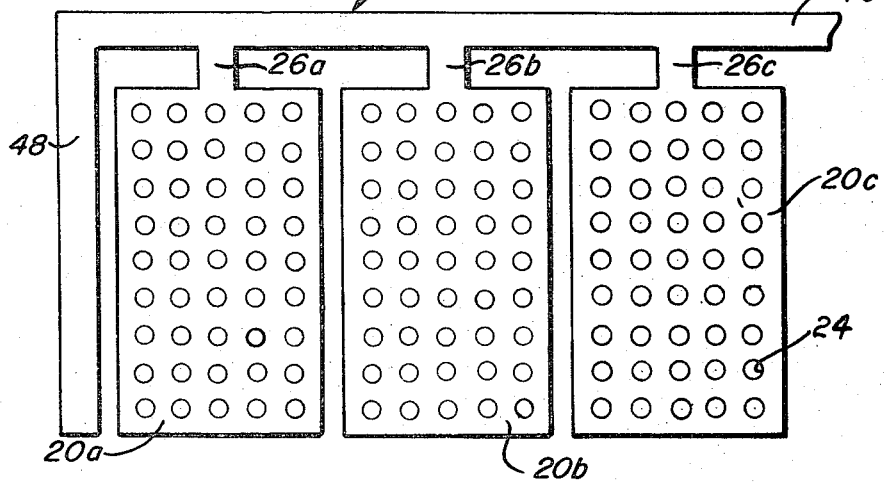
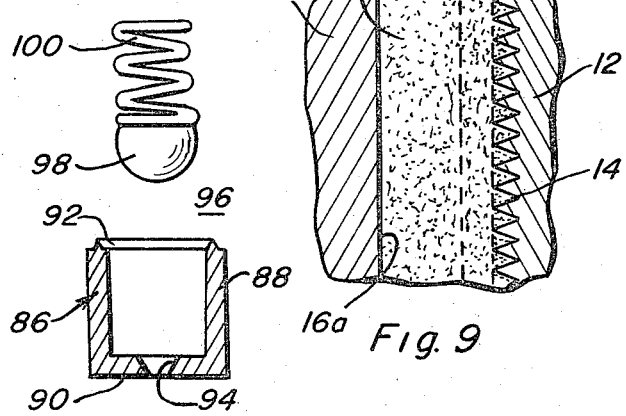
INVENTOR.
RAMESH R. DESAI
BY PENDLETON, NEUMAN
SEIBOLD & WILLIAMS
ATTORNEYS

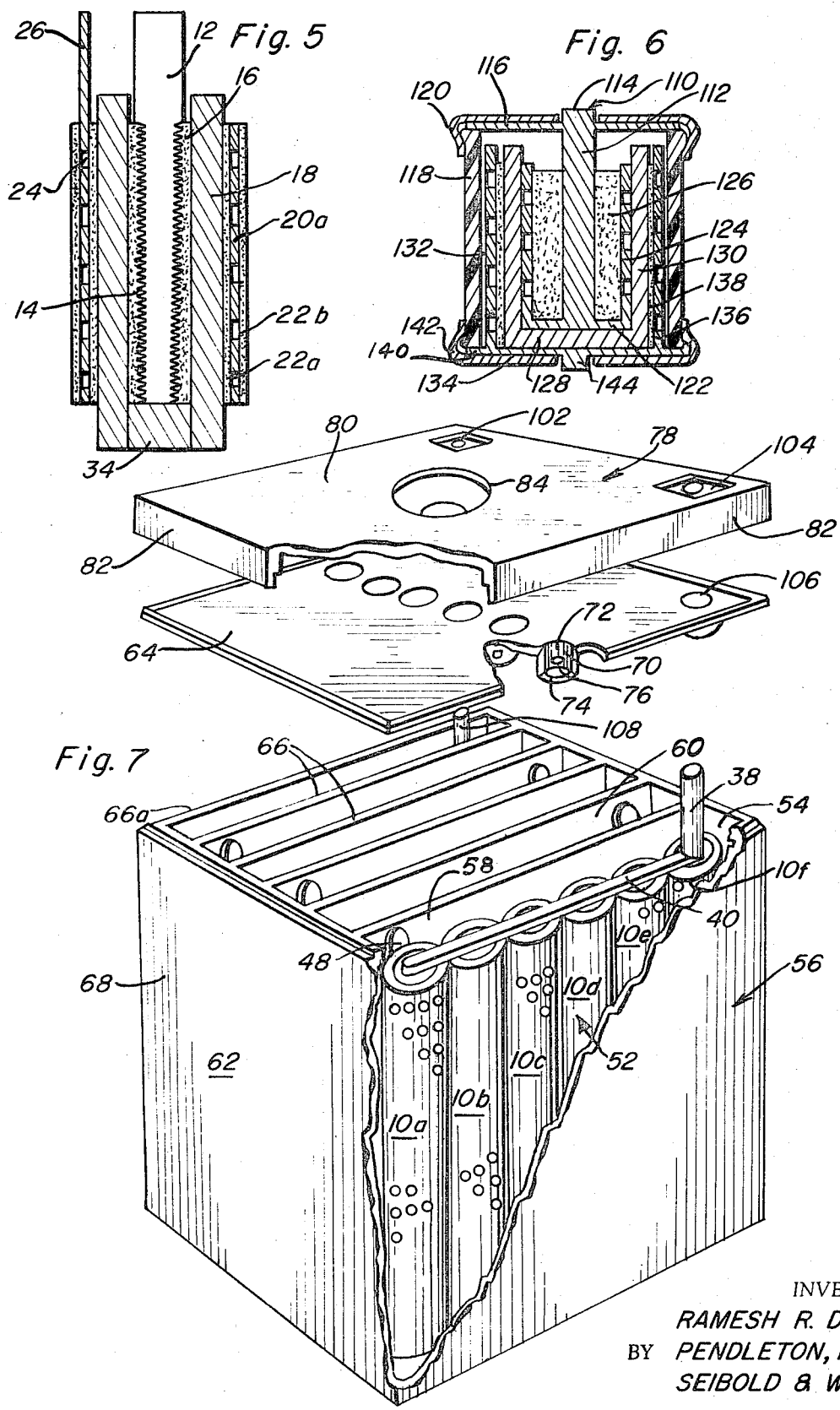

United States Patent Office 3,846,175
Patented Nov. 5, 1974

3,846,175
STORAGE BATTERY
Ramesh R. Desai, New Providence, N.J., assignor to Globe-Union Inc., Milwaukee, Wis.
Filed Jan. 18, 1968, Ser. No. 698,782
Int. Cl. H01m 35/04
U.S. Cl. 136—14                     9 Claims

ABSTRACT OF THE DISCLOSURE

A storage battery which is normally sealed or gas-tight and maintenance-free. Cylindrical electrodes are utilized in one especially useful lead-acid battery constructed according to the invention with excess negative electrode material and exposed negative support to maintain extremely low internal pressures and the ability to recycle many times at good efficiency.

---

Many efforts have been made to create gas-tight maintenance-free batteries but all have failed to attain optimum characteristics in a commercially feasible cell. Lead-acid is a well-known and proven electrochemical system for batteries for automotive and stationary use and in recent times serious efforts have been made to adopt the lead-acid system to portable uses. Spill-proof lead-acid batteries have been widely used and usually incorporate baffled vents such that they can be tipped or agitated without loss of electrolyte. Nevertheless, such batteries generate gases which are released to the atmosphere, especially in overcharging; they cannot be gas tight and are not maintenance-free. Similarly, successful lead-acid batteries have been made with an immobilized electrolyte in a gel, microporous support or the like, but such batteries generate gases, which have to be vented, and hence are not gas tight.

There has been an unsatisfied need for a lead-acid battery which is sealed and gas-tight and which has no maintenance requirements. Such desiderata have escaped the art heretofore because of certain fundamentals of battery operation.

Gases are generated in any battery when the battery is being overcharged. During the charge cycle, the negative and positive materials are being converted into the fully charged state. In a lead-acid battery this state reduces all available and usable negative material to lead, Pb, and oxidizes all usable positive material to lead dioxide, $PbO_2$. Additional charging current causes electrolysis of the water and, thus, generates free hydrogen at the negative plate and free oxygen at the positive.

Such gases must either be consumed or vented to the atmosphere. The only alternative, of course, would be the generation of excessive internal pressures and self-destruction of the cell. It has been suggested that the hydrogen and oxygen could be recombined in the presence of an auxiliary electrode, but this involves additional battery structure. It has also been proposed that excessive pressures can be avoided by the combination of two techniques. First, hydrogen evolution can be prevented by providing at the negative plate an excess or reserve of uncharged negative material. That is, when the positive plate has been fully charged (oxidized to $PbO_2$) and has begun to release oxygen by electrolysis, there is still PbO or $PbSO_4$ available at the negative plate which can be reduced to Pb whereby the hydrogen ions in the eletrolyte are recombined with the oxygen and not liberated.

Second, it has been discovered that by the proper selection of cell geometry, it is possible to produce recombination of the oxygen generated at the positive plate with the lead at the negative plate providing additional PbO at that location. The term "plate" is used herein in a broad sense to include not only the conventional pasted grids of conventional lead-acid battery but any equivalent structure usually involving some type of conductive support for a shaped mass of active material.

The normal battery cycle can be stated:

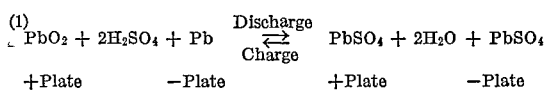

When the available positive material is oxidized and the additional oxygen diffuses to the negative plate, the following local reaction occurs:

(2)                 $Pb + \tfrac{1}{2}O_2 \rightarrow PbO$ and depending upon the acid avilable the PbO may be converted to $PbSO_4$:

(3)              $PbO + H_2SO_4 \rightarrow PbSO_4 + H_2O$

Whether or not such further reaction occurs, the negative plate has further divalent lead available in the charge cycle according to either of the following reactions:

(4)              $PbSO_4 + 2e^- \rightarrow Pb + SO_4^{++}$ (5)           $PbO + H_2O + 2e^- \rightarrow Pb + 2OH^-$ Battery constructions made in accordance with this invention will take such reactions into account and be constructed and proportioned to assure the proper balance therebetween.

Maintenance-free batteries using the lead-acid system have been built utilizing calcium as a lead alloy and eliminating the more common antimony from the battery plates. Such batteries exhibit good cycle life, that is, they can be charged and recharged many times, but the plates are thick and, thus, the energy stored per unit weight is low. Other lead-acid batteries have been constructed utilizing antimony-free lead for the grid structure for the plates in which the plates were made quite thin, but in such instances the battery exhibited relatively poor cycle life.

It has been shown that one cause of limited cycle life in lead-acid batteries is related to the formation of a lead sulfate ($PbSO_4$) barrier layer which surrounds the positive grid or other supporting conductive structure causing premature polarization during discharge.

It is the principal object of this invention to produce a gas-tight maintenance-free battery.

An important additional object of the invention is the provision of a battery which will not be subject to premature positive plate polarization.

Other objects of the invention are set out hereinafter and will be manifest from this description, the accompanying drawings and the appended claims.

A chemical and mechanical system is provided which can be formed into a gas-tight maintenance-free lead-acid battery. The battery has the highest energy density (energy per unit volume) and specific energy (energy per unit weight) possible consistent with the other objects of the invention.

The battery has capability to withstand continuous overcharge, without building excessive internal pressures, and it can be cycled, i.e., charged and discharged, a large number of times.

In one form of this invention, a lead-acid cell is constructed as a plurality of concentric cylindrical elements. A central lead pin supports a mass of active positive material which surrounds it and is conductively associated with it. This positive plate is surrounded by a microporous separator wetted with $H_2SO_4$ and a cylindrical negative lead sheath surrounds the separator and is wetted by it. The negative sheath is perforate and supports the active negative material on either or both of the major surfaces thereof. Appropriate packaging is provided for one or more such cells.

For a more complete understanding of the invention, reference will now be made to the accompanying drawings wherein:

FIG. 1 is a diagrammatic, fragmented perspective of one embodiment of the invention;

FIG. 2 is a sectional elevational view of a positive support for a battery configuration comprising a plurality of the cells of FIG. 1.

FIG. 3 is a bottom plan view of the positive support of FIG. 2.

FIG. 4 is an elevational view of a blank used to form the negative support associated with the positive support of FIGS. 2 and 3;

FIG. 5 is a partial longitudinal sectional view of an alternate cell construction;

FIG. 6 is a longitudinal sectional view of an alternate cell construction in a sealed single cell assembly;

FIG. 7 is an exploded perspective view of one complete multiple cell battery constructed according to the invention;

FIG. 8 is an exploded view of one safety valve usable in the embodiment of FIG 7; and FIG. 9 is a diagram illustrating positive plate construction according to this invention.

Referring now to the drawings, and more particularly to FIG. 1, a single cell 10 is shown diagrammatically and partially broken away. The cell 10 is made up of a plurality of concentric elements surrounding a central positive support pin 12. The support pin 12 may be pure lead or may be an alloy with small amounts of metals less noble than lead. The upper portion 12a of support 12 acts as a positive terminal and the lower portion is provided with grooves 14.

The grooves 14 may be circular or in the form of threads. This support area can also be increased by other means such as longitudinal grooves or the like. The grooves provide increased contact area with the active positive material 16 for optimum electrical connection with minimum resistance and minimum hazard of positive plate polarization. The grooves 14 also assist in the mechanical support of the active material 16 although this is of relatively minor importance as the amount of active material 16 and the relative thickness of the layer is such that the active material is capable of substantial self-support. The separator 18, being wrapped around the positive active material 16, also provides some support for the positive active material. In fact, it substantially prevents any shedding of the positive active material. It is important that the conductive support is remote from, and preferably uniformly remote from, the surface 16a of the active material 16. The surface 16a is in active engagement with the separator 18 which is preferably a microporous material wetted with electrolyte.

By providing a uniform, relatively thick layer of active material 16 surrounding the cylindrical support 12, the formation of $PbSO_4$ as a barrier layer directly adjacent the support 12 is avoided. By following the teaching of this invention positive plate polarization, a common defect in many conventional batteries employing pasted grids, is substantially eliminated. This is illustrated in FIG. 9 where a small fragment of the positive support 12, active material 16 and separator 18 are shown. During discharge, the initial chemical reaction occurs at the interface 16a and the electrolyte contained in separator 18 reduces the $PbO_2$ to $PbO$ which in turn becomes $PbSO_4$ in the presence of substantial acid as explained above. If a layer of $PbSO_4$ is formed directly on the grooved surface 14 of support 12, the cell 10 becomes partially polarized and the capacity is reduced. Thus, in accordance with this invention the materials are so selected and proportioned that there is substantial active material 16 disposed on all surfaces of support 12 so that the cell will, under all normal conditions, retain a thickness of active material which has not become $PbSO_4$. In FIG. 9 a thickness Y illustrates the original thickness of the active material. A thickness X is illustrated diagrammatically as the thickness which will never be converted into $PbSO_4$, thus one design criteria, according to this invention is:

(6) $$X > 0 = Y$$

for all normal rates and conditions of discharge. When this criteria is met, improved cycle life and overall battery life and capacity will result.

The positive material 16 may be any battery paste having the desired adhesion and chemical characteristics. A mixture of $PbSO_4$, $Pb_3O_4$ and $H_2SO_4$ is satisfactory. The conventional paste utilized in automobile batteries may be used. However, a high degree of purity is required in all materials as even a fraction of 1% of a metal more noble than lead can be detrimental. Cells may be built using the active materials in powder form. Such cells, however, operate at a relatively lower efficiency.

The separator may be any appropriate material capable of holding sufficient electrolyte and providing the electrolyte at the active plate surfaces. It is preferable that the separator have a pore volume of at least 70%. Workable separators are glass fiber matting, rubber filled with silica gel, polypropylene fibers, and microporous polyvinyl chloride. One surprisingly useful material is an ultrafine fiber mat of randomly oriented borosilicate glass, free of any binders and having a void volume of approximately 90%. The material has a bulk density of 0.15 grams per cubic centimeter, and an electrical resistivity of 0.318 Ohm-cm.

Returning to FIG. 1, the separator 18 is surrounded by a negative plate which comprises a perforate support 20 having negative active material 22 secured thereto and in electrically conductive relationship therewith. The negative support 20 is formed as a rectangle, perforated, pasted, and rolled into a cylinder. The perforations 24 are essential as they provide for the flow of electrolyte to the reverse side or outside of the support 20. They also insure direct exposure of the negative active material to oxygen to facilitate the overcharge reaction (2).

The negative support is preferably pure lead. The essential characteristic is, however, that there should be no metallic impurities therein which have a lower hydrogen overvoltage than lead. That is, the lead must be free of all noble metals more noble than lead. In one form of the invention, a negative support of 99.92% pure lead has proven satisfactory.

The negative support 20 is provided with an integral terminal strip 26 which extends upwardly and can readily be connected to appropriate terminal posts for attachment to external circuitry. As shown in FIG. 1, the negative material 22 is disposed only on the inner surface of the support 20. If desired, the active material 22 may be disposed on the outer surface of the support 20.

As shown in FIG. 5, the plate assembly may comprise the positive post 12, positive material 16, and separator 18 with a negative support 20a having negative active material 22a on the inside surface and material 22b on the outside surface. With appropriate dimensional adjustments, such a construction appears to exhibit the same characteristics as the embodiment of FIG. 1.

The amount of electrolyte, positive material 16 and negative material 22 are determined by familiar molal consideration for the complete battery reaction. In addition, uncharged negative active material 20 to 30% in excess of the molal requirements is preferably included to insure against hydrogen gas generation. The negative material 22 may be the same as the positive material 16 although it is preferred that a paste expander be included in accordance with conventional practice.

The battery elements described above may be packaged in various ways. In FIG. 1 a cylindrical receptacle 26 having a bottom wall 28 and side wall 30 receives the entire assembly. A serpentine spacer 32 is disposed between the side wall 30 and the negative support 20 whereby a space is defined for electrolyte wetting of the outer wall of support 20 and for oxygen gas contact to carry out the overcharge reaction (2). Other techniques for supporting the active elements and maintaining this gas space will work equally well. A separator disc 34 is disposed beneath the positive support 12 to insure electrical integrity of the system and avoid any possible short circuit. In general, all of the interstices of the separators 18 and 34 will not be filled with electrolyte and thus the separator will not be saturated. However, saturation or a small amount of excess free electrolyte will not be detrimental.

In one typical embodiment of the invention, as shown in FIG. 1, the positive support 12 has a diameter of 0.25 inch, the positive material 16 has a diameter of 0.28 inch, the separator 18 has an outside diameter of 0.56 inch, the negative support 20 has an inside diameter of 0.59 inch and an outside diameter of 0.62 inch and the container 26 may be of any convenient size. With such a configuration, the voltage is nominally 2 volts and the capacity is about one ampere hour for each 4 inches of length in the active materials.

Cells constructed in accordance with the foregoing, whether sealed or unsealed, are capable of undergoing a continuous overcharge for extended periods of time without significant degradation. In one test a 0.375 ampere hour 2 volt sealed cell was continuously overcharged for 1,000 hours at the rate calculated to charge the battery in 10 hours (the 10 hour rate) and at no time did the internal pressure exceed 6.0 p.s.i.g. Furthermore, the same sealed cell was cycled, a cycle being discharged at the 8 hour rate until the terminal voltage is 1.75 volts and then charged at the 10 hour rate for 16 hours, with no significant loss of capacity.

It is believed that cells constructed according to this invention will still require forming (initial programmed charge) as that term is known in the art. It appears that no chem-setting is required.

Referring now to FIGS. 2 and 3, a simple means for assembling high capacity cells is shown. The positive support 36 comprises a longitudinal bus 44 from which a plurality of pins 12a, 12b and 12c extend. A single terminal post 38 extends upwardly therefrom. While three pins 12 are here shown in parallel, it will be apparent that any number may be so assembled and the total capacity will be substantially the sum of the individual capacities. It has been found that there is substantial corrosion on the pins 12 and bus 44 above the active materials, and, therefore, those surfaces are preferably covered with a nonconductor such as the epoxy coating 40. Also, an acid resistant plug 42 may be utilized to further reduce the corrosion.

A set of negative supports 20a, 20b, and 20c are shown in FIG. 4 prior to formation into cylinders. Each of the supports 20 is perforated with holes 24 or slots over its entire area to insure electrolyte communication and each has a terminal 26a, 26b and 26c connected together through a negative bus 46. The negative assembly 50 may be connected to a terminal post or to other similar assemblies through a connector 48. The manifold negative support 50 cooperates with the manifold positive support 36 to provide a high capacity cell. Because of the physical limitations on the diameters which can be efficiently used, such a system provides surprisingly better results than merely enlarging a cell.

The manner in which the cells 10 are assembled to form a battery is shown in FIG. 7. In the illustrated embodiment each cell 10 has a capacity of 1.25 ampere hours and six cells 10a–10f are connected in parallel to form a 7.5 ampere hour 2 volt cell assembly 52. The cell assembly 52 is disposed in one cavity 54 of a six cavity battery case 56. The negative terminal strip 48 is formed to provide communication through the cell wall 58 to the next adjacent cavity 60. The six cells are thus interconnected to form a 12 volt 7.5 ampere hour battery 62.

In one preferred embodiment the entire battery is sealed with a common gas storage area. This is not detrimental to battery life because there is insufficient mobile electrolyte to permit intercell electrolyte travel. The casing 56 has an inner cover 64 sealed to all of the upper edges 66 of the various inner walls 60 and outer walls 68. The inner cover 64 is provided with a plurality of vents 70, one for each cavity 60. Each vent comprises a cylindrical wall 72 extending downwardly into the cavity 60 with a bottom wall 74 closing the vent. One or more small apertures 76 are formed near or in the bottom wall 74 so that any accumulated gas can escape. However, in the event that there is a small amount of free electrolyte in the cell, it will be retained by the cylindrical wall 72 which forms a baffle. Thus the battery can operate in any position.

An outer cover 78 is sealed only to the outer edges 66a of the battery casing. The outer cover 78 has a planar web 80 with depending side walls 82 which engage the casing. A single gas chamber is thus defined for all cells and this facilitates the rapid recombination of any oxygen which might be generated by providing increased absorptive capacity.

A safety valve 84 is provided in the cover 78 to avoid the possibility of self-destruction in the event of excessive pressure build-up. While such a malfunction would never occur in normal usage, charging for a prolonged period at an excessive rate exceeding the recombination rate of the oxygen could result in such a pressure build-up. Any appropriate valve can be employed and a simple one is illustrated in FIG. 8. This ball valve 96 comprises a housing 86 having a cylindrical wall 88 and a base 90. The cylindrical wall has an upper edge 92 adapted for attachment to the underside of the cover web 80 and the bottom wall 90 has a conic aperture 94 formed therein. When assembled, the ball 98 engages the conic aperture 94 to form a seal and is maintained thereagainst by the spring 100 which is compressed between the ball 98 and the underside of web 80. The spring is selected to provide any desired release pressure, such as, for example, two atmospheres and if such pressure is exceeded, the pressure will be relieved without permanent damage.

The inner cover 64 and outer cover 78 are provided with apertures 102, 104 and 106 to pass the battery terminals 38 and 108. The terminals may be sealed to the covers in any appropriate manner such as by an epoxy cement. A thin wall section may be provided in the cover to provide further protection in the event that the valve proves inadequate.

While a common gas space is preferred, batteries may be built with a separate gas space for each cell.

A single sealed cell is illustrated in FIG. 6. While the construction illustrated in FIG. 1 may be incorporated into a single sealed cell, the embodiment of FIG. 6 provides certain desirable characteristics. The positive support 110 comprises a central pin 112 which forms a contact 114. A supporting disk 116 extends outwardly therefrom and is clamped between a cylindrical casing 118 and a cover clamp 120. The pin 112 has a bottom 122 which supports a perforated lead cylinder 124. The active positive material 126 is disposed therein. The cylinder 124 is apertured to provide for the ingress and egress of electrolyte. A porous separator comprising bottom 128 and side wall 130 surrounds the positive plate and a negative plate 132 receives the entire assembly. The negative plate 132 comprises a supporting cup including base 134 and perforate side walls 136. The active negative material 138 is secured to the side wall 136. A flange 140 extends outwardly beyond the side wall 136 and is clamped between the cylindrical casing 118 and a bottom clamp 142. A small contact 144 extends outwardly from base 134 through an aperture in clamp 142. Thus, a cell much like a conventional dry cell is provided in a simple secure package.

By recognizing certain basic concepts, it has been possible to create gas-tight maintenance-free lead-acid batteries having greatly enhanced characteristics. While several specific and highly advantageous embodiments have been described herein, it will be quickly recognized that batteries of many varieties can be constructed which will be free of detrimental gas generation, and plate deterioration and will have greatly reduced tendencies to positive plate polarization by following the teaching hereof.

Without further elaboration, the foregoing will so fully explain the character of the invention that others may, by applying current knowledge, readily adapt the same for use under varying conditions of service, while retaining certain features which may properly be said to constitute the essential items of novelty involved, which items are intended to be defined and secured by the following claims.

I claim:

1. A substantially gas-tight maintenance-free cell comprising a sealed housing, a substantially cylindrical positive support disposed within said housing, said support having undulations in the surface thereof to increase the surface area, porous positive active material formed as a cylinder surrounding said support and filling the undulations thereof, cylindrical porous separator material surrounding said positive material and having communicating interstices therein, a perforate, lead, substantially cylindrical negative support, porous negative active material on the surfaces of said negative support, said negative support and negative material surrounding said separator, said negative active material having electrical capacity substantially in excess of the electrical capacity of said positive active material, electrolyte substantially filling the interstices in said separator material and said active materials, the radial thickness of said positive active material being sufficient to provide a layer of unoxidized material completely covering said positive support, irrespective of the state of charge of said battery, and spaced electrical terminals externally disposed in said housing and electrically communicating with said positive and negative supports, respectively.

2. A gas-tight maintenance-free battery comprising a plurality of cells constructed in accordance with claim 1 wherein said housings comprise a casing, said casing having walls defining a plurality of gas-tight chambers, at least one of said cells being disposed in each of said chambers, electrical conductors passing through said walls and interconnecting said cells in said chambers serially, terminal means secured in said casing and electrically connected to the terminal ones of said serially connected cells, means defining a gas storage space within said casing, and normally sealed vent means in said casing, said vent means providing gaseous communication between said chambers and the atmosphere only when the pressure within said chambers becomes excessive.

3. The gas-tight maintenance-free cell of claim 1 wherein the electrical capacity of said negative active material exceeds the electrical capacity of said positive material by approximately 30%.

4. The gas-tight maintenance-free cell of claim 1 wherein said electrodes are substantially free of any metals more noble than lead.

5. The gas-tight maintenance-free cell of claim 1 wherein said positive support has a diameter of about 0.25 inch and said positive material has a diameter of about 0.28 inch.

6. A gas-tight maintenance-free cell comprising a plurality of cylindrical electrode assemblies according to claim 1 wherein said housing comprises a casing of generally rectangular shape and a plurality of electrode assemblies are assembled in side-by-side relationship within said casing and connected in parallel electrical relationship.

7. The gas-tight maintenance-free cell of claim 6 wherein said positive supports are formed integrally with said positive terminals and with an interconnecting bus.

8. The gas-tight maintenance-free cell of claim 7 wherein said negative supports are integrally formed with said negative terminals and with a negative bus interconnecting said terminals.

9. A gas-tight maintenance-free battery comprising a plurality of cells constructed in accordance with claim 8 wherein the housings comprise a casing, said casing having walls defining a plurality of gas-tight chambers, one of said cells being disposed in each of said chambers, electrical conductors passing through said walls and interconnecting said cells in said chambers serially, terminal means secured in said casing and electrically connected to the terminal ones of said serially connected cells, means defining a gas storage space within said casing, and normally sealed vent means in said casing, said vent means providing gaseous communication between said chambers and the atmosphere only when the pressure within said chambers becomes excessive.

References Cited

UNITED STATES PATENTS

| | | | |
|---|---|---|---|
| 1,518,814 | 12/1924 | Pack | 136—14 |
| 2,391,001 | 12/1945 | Arnoldi | 136—14 |
| 2,469,508 | 5/1949 | Malki et al. | 136—14 |
| 2,487,831 | 11/1949 | Rupp | 136—14 |
| 3,227,583 | 1/1966 | Carlisle | 136—6 |
| 3,257,237 | 6/1966 | Jache | 136—26 |
| 3,287,165 | 11/1966 | Jensen | 136—26 |
| 3,377,201 | 4/1968 | Wagner et al. | 136—13 |

WINSTON A. DOUGLAS, Primary Examiner

C. F. LeFEVOUR, Assistant Examiner

U.S. Cl. X.R.

136—26

UNITED STATES PATENT OFFICE
CERTIFICATE OF CORRECTION

Patent No. 3,846,175          Dated November 5, 1974

Inventor(s) Ramesh R. Desai

It is certified that error appears in the above-identified patent and that said Letters Patent are hereby corrected as shown below:

Column 4, line 7, " $X > O = Y$ "  should be

-- $O < X \leq Y$ --

Signed and sealed this 28th day of January 1975.

(SEAL)
Attest:

McCOY M. GIBSON JR.
Attesting Officer

C. MARSHALL DANN
Commissioner of Patents